July 22, 1952     J. F. SWIFT     2,603,984
TRANSMISSION
Filed May 26, 1948
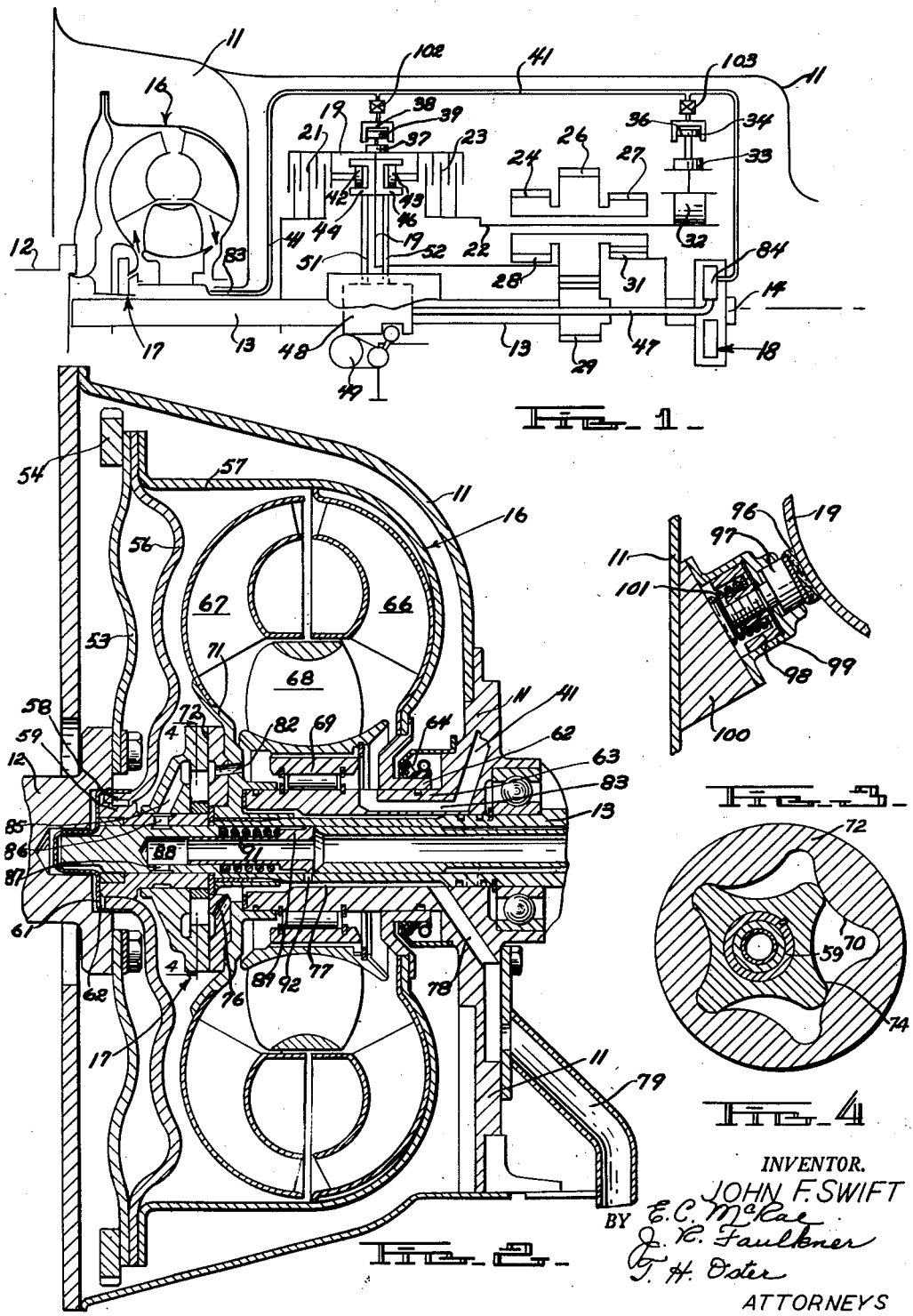
INVENTOR.
JOHN F. SWIFT
BY E. C. McRae
J. R. Faulkner
T. H. Oster
ATTORNEYS

UNITED STATES PATENT OFFICE 2,603,984

TRANSMISSION

John F. Swift, Ypsilanti, Mich., assignor to Ford Motor Company, Dearborn, Mich., a corporation of Delaware Application May 26, 1948, Serial No. 29,388

4 Claims. (Cl. 74—732)

This invention relates generally to a transmission and particularly to a transmission of the type utilizing a fluid pump for supplying fluid under pressure to a control system for the transmission.

Conventional automatic or semiautomatic transmission for motor vehicles generally utilize a hydraulic system to control the operation of the transmission. Fluid under pressure is usually supplied to the hydraulic control system by a pair of fluid pumps of any suitable type, one of the pumps being located at the load or tail shaft of the transmission and driven thereby, while the other pump is located at the input side of the transmission and driven either directly or indirectly by the flywheel of the engine. The load shaft pump is necessary to enable fluid pressure to be supplied when the vehicle is coasting and also when the engine is stalled and it is necessary to start the engine by pushing the car. The front pump is also essential, since during idling and low-speed conditions the load shaft pump will not furnish sufficient fluid under pressure to operate the hydraulic control system. Although one pump would have sufficient capacity for the system, two must thus be employed, resulting in an unnecessary loss of power and torque during normal operating conditions.

It is accordingly an object of the present invention to provide a transmission in which a pump is located between a driving and a driven member of the transmission and is operated by the speed differential existing between the driving and driven members. The arrangement is such that the output of the pump is proportionate to the differential speed between the driving and driven members and progressively decreases as the speeds of the driving and driven members become equalized. An arrangement of this type is particularly advantageous when employed in a transmission utilizing a hydraulic torque transmitting device such as a fluid coupling or a torque converter. In the case of a torque converter, for example, the differential pump may be connected between the converter impeller and the converter turbine. Inasmuch as the impeller is driven by the input shaft or engine flywheel and the turbine is connected to the load or output shaft of the transmission, it will be seen that a maximum differential speed exists between the impeller and turbine during idling, and that as the vehicle speed increases the speed of the turbine will progressively approach the speed of the impeller and the output of the pump will be gradually reduced until it reaches a minimum during normal operation of the transmission. At this time, the speeds of the impeller and turbine are substantially equal, and consequently the pump is practically inoperative.

Another object of the present invention is to provide a transmission employing a differential pump in combination with a second pump, the output of the differential pump being at its maximum during idling and gradually decreasing while the output of the second pump is a minimum during idling and gradually increases. Sufficient fluid under pressure is thus supplied to the hydraulic control system of the transmission at all times, both during idling and low speeds and also under high speed conditions, yet full operation of two pumps is avoided. This results in a power saving and also prolongs the life of the differential pump. Normally, there is a torque reaction loss in a fluid pump used in a transmission since the reaction is taken by the housing, but in the differential pump utilized in the present transmission the torque reaction is taken by a driven member in the transmission and is thus utilized to assist in driving the vehicle wheels, and this power loss is thus avoided.

Still another object of the invention is to provide automatically operated means for imparting sufficient drag or reaction in the system to insure operation of the pump when starting the engine or during idling, provision being made for automatically releasing this drag when it is no longer necessary so that it will not be present during normal operation conditions.

A further object of the invention is to provide a transmission having a hydraulic torque transmitting device, the fluid chamber of which is expansible under pressure so that it may act as a fluid accumulator holding an excess of fluid under pressure which may be instantaneously supplied to the fluid pressure control system of the transmission when necessary to apply brake or clutch actuating means. This eliminates the time lag in operation of the actuating devices which might otherwise occur due to the time necessary for the fluid pump to supply sufficient fluid to actuate the devices. This may be accomplished by providing for movement of one or more of the walls of the hydraulic torque transmitting device under the action of fluid pressure supplied by a hydraulic pump. The output of the pump, may for example, be passed through the hydraulic torque transmitting device and then into the hydraulic control system.

Other objects and advantages of the present invention will be made more apparent as this description proceeds, particularly when considered in connection with the accompanying drawings, in which:

Figure 1 is a diagrammatic view of a transmission embodying the present invention.

Figure 2 is an enlarged cross sectional view through a portion of the transmission shown in Figure 1, illustrating the torque converter and the differential pump thereof.

Figure 3 is a fragmentary cross sectional view of the mechanism utilized to automatically apply drag in the transmission during idling.

Figure 4 is a cross section through the pump taken on the line 4—4 of Figure 2.

While it will be understood that the present invention may be employed in various types of transmissions, for the purpose of illustration there is shown diagrammatically in Figure 1 a three-speed automatic transmission of the planetary type employing a torque converter and in which the various control devices of the transmission are hydraulically actuated.

The transmission is housed within a casing 11 and has a drive shaft 12 adapted to be connected to the crank shaft of the vehicle engine (not shown), an intermediate shaft 13 and a load shaft 14 adapted to be connected to the rear axle drive means of the vehicle.

The transmission includes a torque converter 16, a differential pump 17, and a load shaft pump 18. The shaft 13 is driven through the torque converter 16 from the drive shaft 12 in a manner to be described more in detail later, and the intermediate shaft 13 is adapted to be connected to a clutch carrier 19 by a second speed clutch 21. The clutch carrier 19 is also adapted to be locked to a planet carrier 22 by means of a third speed clutch 23.

The planet carrier 22 is mounted for rotation about the axis of the intermediate shaft 13 and carries clusters of planet pinions 24, 26, and 27. Planet pinions 24 mesh with a sun gear 28 carried by the clutch carrier 19, planet pinions 26 mesh with a sun gear 29 mounted upon the intermediate shaft 13, and planet pinion 27 with the sun gear 31 carried by the load shaft 14. In order to transmit torque through the multiple planetary gearing system in the forward direction, an overrunning clutch 32 is connected to the planet carrier 22. The overrunning clutch 32 is selectively connected to the transmission casing by means of the forward speed brake 33. The brake 33 is actuated by the hydraulic cylinder 34 and piston 36.

To condition the transmission to transmit torque in the reverse direction, reverse speed brake mechanism 37 is provided to selectively lock the clutch carrier 19 to the transmission casing. The reverse speed brake is adapted to be actuated by the hydraulic cylinder 38 and piston 39. The forward and reverse speed cylinders 34 and 38 respectively are supplied with fluid from a fluid conduit 41 innerconnecting the cylinders and the pumps 17 and 18.

The second and third speed clutches 21 and 23 are actuated by pistons 42 and 43 housed within cylinders 44 and 46 respectively, and fluid under pressure for operating the clutches is supplied from the load shaft pump 18 through a conduit 47 to a sleeve valve 48 controlled by a centrifugal governor 49. From the sleeve 48 the fluid is distributed to the cylinders 44 and 46 through conduits 51 and 52 respectively.

By selective operation of the forward speed brake 33, the second speed clutch 21, the third speed clutch 33, and the reverse speed brake 37 by the hydraulic actuating devices described above, torque may be transmitted to the transmission in any one of three speeds forward and one speed reversed.

Reference is now made to Figure 2 for a more detailed description of the torque converter 16 and the differential pump 17. In place of the usual rigid heavy flywheel a flexible disk or flywheel 53 is provided and is bolted or otherwise suitably secured to the drive shaft 12 and carries a ring gear 54 at its periphery. The periphery of the flexible disk 53 is also connected to the peripheries of an inner shroud 56 and an outer shroud 57, the latter cooperating with the former to form a rotating fluid chamber housing for torque converter 16. At its inner edge the inner shroud 56 is formed with a forwardly extending axial flange 58 keyed to a hub 59 to permit axial sliding movement of the flange 58 upon the hub. A sheet metal cap 61 encircles the annular flange 58 and is telescopically received and piloted within an annular groove 62 formed at the rearward end of the drive shaft 12.

It will be noted that intermediate their inner and outer portions, the flexible disk 53 and inner shroud 56 are separated from each other and are suitably corrugated or contoured to prevent bending stresses in the crankshaft from being transmitted to the torque converter.

The radially inner edge of the outer shroud 57 of the torque converter carries a hub 62 which is piloted upon an annular flange 63 of the transmission housing 11. A seal 64 is provided between the hub 62 and the casing. It will be apparent that the outer shroud 57 of the torque converter may be flexed axially rearwardly by the fluid pressure within the torque converter, the hub 62 at the radially inner edge of the shroud being adapted to slide axially upon the annular flange 63 of the casing. The torque converter is conventionally provided with an impeller 66 carried by the outer shroud 57, a turbine 67 and a reactor 68. The reactor 68 is connected through an overrunning brake 69 to the forwardly extending portion of the annular flange 63 of the transmission casing.

The turbine 67 is mounted upon a hub 71 which in turn is secured to the housing 72 of the differential fluid pump 17. Although various types of fluid pumps can be used with the present invention, the pump 17 is a conventional pump of the well known internal rotor type in which the housing 72 is formed with an internal gear or rotor 70 within which is received a pinion gear or rotor 74 formed on the hub 59 and having one less tooth division than the internal rotor 70, with the axis of the pinion rotor being offset from the axis of the internal rotor. The hub 59 is connected to the axial flange 58 of the inner shroud 56 and forms the driving element of the pump. Inasmuch as the inner shroud 56 is connected by means of the outer shroud 57 to the impeller 66, it will be seen that the differential pump 17 is directly connected between the impeller 66 and the turbine 67. During idling, when the vehicle is stationary, the turbine 67, which is connected to the intermediate shaft 13 of the transmission by the hub 71, is stationary, and a maximum differential speed is obtained between the two elements of the pump. The output of the pump is therefore at a maximum. As the vehicle begins to move and increases its speed, the speed of the intermediate shaft 13 and the turbine 67 gradually increases and approaches the speed of the impeller 66. At the same time, the differential speed between the two elements of the pump decreases and the output of the pump is accordingly decreased. When normal operating conditions are reached, the speed of the turbine is substantially that of the speed of the impeller, and the two elements of the pump are accordingly rotating at substantially the same speed. The output of the differential pump 17 is therefore practically nil.

The input of the differential pump 17 communicates with the transmission sump through conduit 76 in the pump housing 72, conduit 77 in the intermediate shaft 13, conduit 78 in the transmission casing 11, and tube 79. The pressure chamber 81 of the differential pump 17 communicates through a conduit 82 in the pump housing 72 with the interior of the torque converter 16, through the space between the turbine 67 and reactor 68. A fluid outlet is provided between the impeller 66 and the reactor 68 and communicates through a conduit 83 in the annular hub 63 of the casing to the supply conduit 41, Figure 1. Fluid under pressure is thus supplied to the hydraulic control system from the pressure chamber 81 of the differential pump 17 after first being transmitted through the torque converter 16. Inasmuch as the supply conduit 41 is also connected to the pressure chamber 84 of the load shaft pump 18, it will be seen that the two pumps are innerconnected and each supplies fluid pressure to the entire hydraulic system.

Provision is made for limiting the pressure in the system to a predetermined value. The pressure side of the differential pump communicates through a passage 85 in the pump housing and ports 86 and 87 in the hub 59 and intermediate shaft 13 respectively to the central bore 88 of the intermediate shaft. A relief valve 89 is slidably mounted within the bore 88 and is urged by means of a spring 91 to a position covering the exhaust port 92. Inasmuch as the rearward face of the relief valve 89 has a greater area than the forward face thereof, the differential pressure upon the faces will result in moving the valve against the action of the spring 91 when a certain predetermined pressure has been reached, to open the exhaust port 92 and by-pass the fluid pressure from the pressure chamber 81 of the pump to the conduit 77 and thence to the transmission sump.

Reference is now made to Figure 3. A friction shoe 96 is carried at the outer end of a plunger 97 which in turn is threaded into a piston 98 slidably mounted in a cylinder 99 supported upon a bracket 100 carried by the transmission casing 11. A spring 101 normally urges the piston 98 and plunger 97 radially inwardly toward the periphery of the exterior surface of the clutch carrier 19. The resulting frictional engagement between the clutch carrier and the friction shoe 96 carried by the plunger 97 imparts sufficient drag to the clutch carrier to enable the differential pump 17 to operate even though the transmission may be in neutral.

The cylinder 98 is connected by a conduit (not shown) to the cylinder 34 for the forward speed brake 33 so that the friction shoe 96 will be automatically released when the forward speed brake 33 is engaged. It will thus be seen that the device functions only for a short interval of time and unnecessary wear is prevented. With this arrangement, even though the transmission is left in neutral when the vehicle is stopped, sufficient resistance to rotation of the converter turbine and its innerconnected mechanism is provided so that the differential pump will function and will supply fluid under pressure to the hydraulic actuating system, enabling the various controls to be operated.

From the foregoing description it will be seen that the differential pump 17, which is connected between the impeller and turbine of the torque converter, supplies sufficient fluid under pressure to the hydraulic control system during idling and low vehicle speeds to permit the actuation of the various hydraulic controls. As the vehicle speed increases and the load shaft pump 18 becomes operative and supplies fluid pressure to the system, operation of the differential pump 17 is no longer necessary, and its output is automatically and progressively decreased until it is substantially eliminated. As a result, a saving in power is effected since during normal operation only one pump need be operated instead of the usual two. In addition, when the differential pump 17 is in operation, its torque reaction is taken by the turbine and the intermediate shaft and thus is utilized in supplying power to the vehicle wheels. This distinguishes from the normal pump operation in which the reaction is taken by the housing and thus is not used. It has been found that a transmission embodying the present invention is the equivalent of one with the conventional pump installation at low car speed and is considerably superior at speeds above 15 miles per hour. A saving of approximately 50% of the power normally used in driving the fluid pumps is effected, and yet sufficient fluid is provided for all hydraulic control functions.

In addition, the torque converter functions as an accumulator. The fluid chamber formed between the inner and outer shrouds 56 and 57 respectively is expansible under the action of fluid pressure. As previously noted, the inner shroud 56 is somewhat flexible, and in addition the radially inner ends of each of the shrouds are axially slidable. As a result, the volume of the chamber is increased under the action of fluid pressure. The fluid supplied by the differential pump 17 is introduced into the torque converter, and being under considerable pressure results in an expansion of the chamber. An additional supply of fluid under pressure is thus made available for instantaneous application of the various hydraulic actuating devices of the transmission. For example, operation of the valve 102 for the reverse speed cylinder 38, the valve 103 for the forward speed cylinder 34, or the sleeve valve 48 for the second and third speed clutches 21 and 23 respectively, calls for an immediate supply of fluid to the particular cylinder and piston to apply the adjacent clutch or brake. While this can be supplied by the pumps, a time lag results due to the inability of the pumps to supply a sufficient quantity of fluid instantaneously. The expanded shrouds 56 and 57 of the torque converter, however, can immediately return to their normal position when this additional fluid is demanded, and an additional amount of fluid is thus available to immediately apply the particular actuating means. It will be noted, of course, that the entire hydraulic system is interconnected, so that the torque converter functions as an accumulator at all times, regardless of whether or not the front differential pump 17 is in operation. In other words, the fluid pressure from the rear pump is also effective to expand the hydraulic chamber of the torque converter so that it may function as an accumulator.

From the foregoing it will be seen that I have provided a transmission which is no more complicated nor expensive to build than the conventional transmission of this type, yet which results in a greater power and torque output due to the elimination of power losses, and which also is adapted to function in a more effective and efficient manner.

Although I have shown and described certain embodiments of the invention, it will be understood that I do not wish to be limited to the exact construction shown and described, but that various changes and modifications may be made without departing from the spirit and scope of my invention, as defined in the appended claims.

What is claimed is:

1. In a transmission having a casing and drive and load shafts, a sheet metal drive disk secured to one end of said drive shaft, a flexible sheet metal shroud spaced from said drive disk and secured adjacent its periphery to said drive disk, a hub for said shroud telescopically and slidably received within a recess formed in the above-mentioned end of said drive shaft, a second flexible sheet metal shroud secured at its periphery to said drive disk and said first shroud, said second shroud co-operating with said first shroud to form a fluid chamber, an impeller in said fluid chamber mounted upon said second shroud, a turbine in said fluid chamber mounted upon said load shaft, a hub for said second shroud telescopically and slidably co-operating with a portion of said transmission casing, a fluid seal between said last-mentioned hub and said casing, said shrouds and hubs being movable axially outwardly under the action of the fluid pressure in said fluid chamber to increase the volume thereof and form an accumulator for the storage of additional fluid under pressure.

2. In a variable speed power transmission, in combination, a casing, a drive shaft, an intermediate shaft and a load shaft, a hydraulic torque converter having an impeller driven by said drive shaft, a turbine directly connected to said intermediate shaft to drive the latter at a 1–1 ratio and a reactor connected to said casing, gearing between said intermediate and load shafts for transmitting power therebetween at a plurality of different speed ratios, hydraulically actuated control means associated with said gearing for effecting said speed ratios, a fluid pump having a pair of coacting elements, one of said elements being connected to said converter impeller and the other of said elements being connected to said converter turbine, a conduit leading from the output of said pump to the interior of said torque converter, a second conduit leading from the interior of said torque converter to said hydraulically actuated control means to supply fluid under pressure to actuate the latter, the output of said pump varying directly as the relative speed between said impeller and turbine.

3. In a transmission having a casing and drive and load shafts, a driving member, a flexible sheet metal shroud secured adjacent its periphery to the driving member and having its hub mounted for sliding movement in an axial direction, a second sheet metal shroud connected at its periphery to said driving member and to said first shroud and having a hub mounted for sliding movement in an axial direction and co-operating with said first shroud to form a fluid chamber, an impeller in said fluid chamber mounted upon said second shroud, a turbine in said fluid chamber connected to said load shaft, said shrouds and hubs being movable axially outwardly under the action of the fluid pressure in said fluid chamber to increase the volume thereof and form an accumulator for the storage of additional fluid under pressure.

4. In a variable speed transmission for a motor vehicle, in combination, a housing, a drive shaft, a torque converter impeller driven by said drive shaft, a driven shaft, a torque converter turbine directly connected to said driven shaft, a load shaft, variable speed gearing between said driven and load shafts for transmitting power to said load shaft at a plurality of different speed ratios, hydraulically actuated control devices associated with said gearing for effecting said speed ratios, a pair of fluid delivery pumps, conduits interconnecting the outputs of said two pumps to provide a common delivery circuit, conduits connecting said common delivery circuit to said hydraulically actuated control devices, one of said pumps having a housing mounted upon the transmission housing and a rotor in the pump housing driven by said load shaft so that the output of said pump is zero when the vehicle is stationary and progressively increases as the vehicle speed increases, the other of said pumps having a housing operatively connected to said torque converter turbine and a rotor operatively connected to said torque converter impeller so that the output of said second pump is at a maximum when the vehicle is stationary and the first pump is inoperative and decreases progressively as the speed differential between said torque converter impeller and turbine decreases to maintain operating pressure in the common fluid delivery circuit under all conditions, said second fluid pump being substantially inoperative under normal vehicle speed operation in high speed ratio to minimize the power loss due to pump operation.

JOHN F. SWIFT.

REFERENCES CITED

The following references are of record in the file of this patent:

UNITED STATES PATENTS

| Number | Name | Date |
|---|---|---|
| 1,199,359 | Fottinger | Sept. 26, 1916 |
| 1,203,265 | Radcliffe | Oct. 31, 1916 |
| 2,240,650 | Heyer | May 6, 1941 |
| 2,311,740 | Dodge | Feb. 23, 1943 |
| 2,332,593 | Nutt et al. | Oct. 26, 1943 |
| 2,343,955 | Cotterman | Mar. 14, 1944 |
| 2,373,453 | Brunken | Apr. 10, 1945 |
| 2,421,190 | Dodge | May 27, 1947 |
| 2,433,052 | Kelley | Dec. 23, 1947 |
| 2,461,218 | Lapsley | Feb. 8, 1949 |
| 2,511,135 | Torrance | June 13, 1950 |